United States Patent [19]
Schmidt et al.

[11] Patent Number: 4,794,008
[45] Date of Patent: Dec. 27, 1988

[54] METHOD OF PREPARING A PACKAGED FROZEN CONFECTION

[75] Inventors: Walter L. Schmidt, Hopewell Junction, N.Y.; Clement R. Wyss, Hillsdale, N.J.; Edward L. Scarsella, Bedford Hills, N.Y.; John F. Halligan, Riverside, Conn.; Joan M. Adams, Brick, N.J.

[73] Assignee: General Foods Corporation, White Plains, N.Y.

[21] Appl. No.: 20,052

[22] Filed: Feb. 27, 1987

[51] Int. Cl.⁴ .................. B65D 85/78; B65D 81/32
[52] U.S. Cl. ........................... 426/234; 426/107; 426/115; 426/393; 426/130; 426/306; 426/307; 219/10.55 E; 220/4 B; 229/2.5 R; 53/440
[58] Field of Search ............ 426/107, 113, 393, 234, 426/243, 112, 115, 412, 130, 306, 307; 219/10.55 E

[56] References Cited

U.S. PATENT DOCUMENTS

| 797,314 | 8/1905 | Owens | 220/4 |
|---|---|---|---|
| 2,600,566 | 6/1952 | Moffett, Jr. | 99/221 |
| 2,714,070 | 7/1955 | Welch | 99/221 |
| 2,768,086 | 10/1956 | Bliley | 426/393 |
| 2,850,392 | 9/1958 | Gunsberg | 426/113 |
| 3,042,532 | 7/1962 | Daline | 426/412 |
| 3,219,460 | 11/1965 | Brown | 99/192 |
| 3,240,610 | 3/1966 | Cease | 99/171 |
| 3,547,661 | 12/1970 | Stevenson | 99/171 |
| 3,615,713 | 10/1971 | Stevenson | 99/171 H |
| 3,983,256 | 9/1976 | Norris et al. | 426/94 |
| 4,133,896 | 1/1979 | Standing et al. | 426/107 |
| 4,166,208 | 8/1979 | Martel et al. | 219/10.55 E |
| 4,233,325 | 11/1980 | Slangan et al. | 426/107 |
| 4,318,935 | 3/1982 | Stussi | 426/393 |
| 4,328,254 | 5/1982 | Waldburger | 426/393 |
| 4,345,133 | 8/1982 | Cherney et al. | 219/10.55 E |
| 4,364,963 | 12/1982 | Munter et al. | 426/393 |
| 4,413,167 | 11/1983 | Martel et al. | 219/10.55 E |
| 4,481,392 | 11/1984 | Nibbe et al. | 219/10.55 E |
| 4,496,816 | 1/1985 | McNamara | 426/234 |
| 4,558,198 | 12/1985 | Levendusky et al. | 219/10.55 E |
| 4,574,174 | 3/1986 | McGonigle | 426/113 |
| 4,596,713 | 6/1986 | Burdette | 426/113 |

Primary Examiner—Steven Weinstein
Attorney, Agent, or Firm—Thomas A. Marcoux; Thomas R. Savoie; Daniel J. Donovan

[57] ABSTRACT

A packaged frozen food product is provided which is housed in a package which includes a first, substantially microwave permeable portion having a first frozen food component housed therein, and a second, microwave reflective portion having a second frozen food component retained therein. The package also includes a void space between the first frozen food component and the second frozen food component. Upon microwave heating, the first frozen food component will be thawed and the second frozen food component will remain substantially frozen.

4 Claims, 2 Drawing Sheets

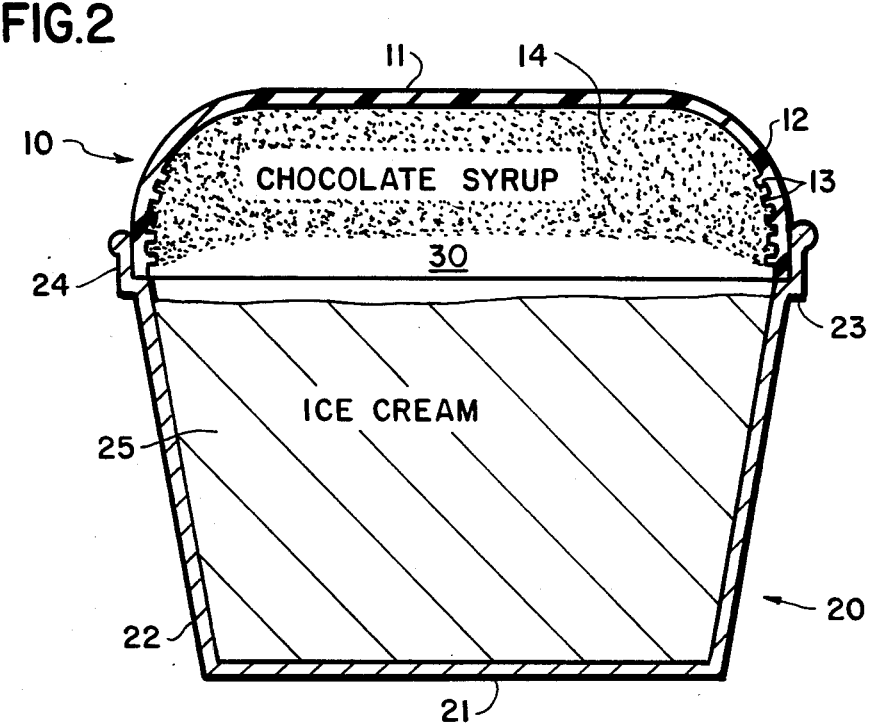
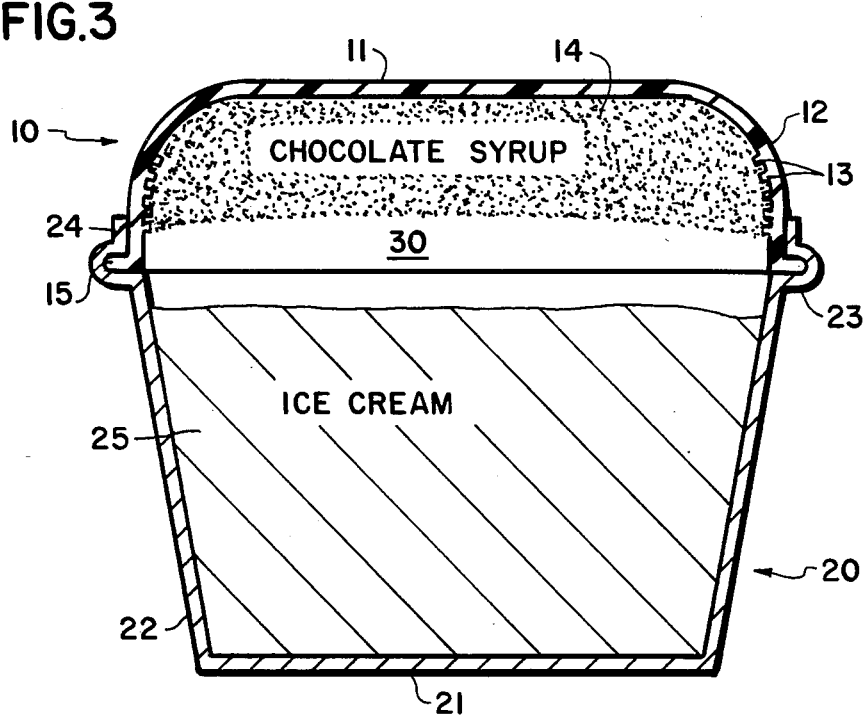

METHOD OF PREPARING A PACKAGED FROZEN CONFECTION

TECHNICAL FIELD

The present invention relates to a packaged frozen food product comprising a container and a food product made up of two distinct frozen components one of which in use, remains frozen and the other of which, before use, is thawed. In another aspect, the invention relates to a packaged frozen food product which, when subject to microwave heating, will cause thawing only of the component intended to be thawed and/or heated before use while the other component remains substantially frozen. In a further aspect, the invention relates to such a package which, on simply being opened, can also be used as a container to hold the food product while it is eaten.

BACKGROUND ART

Several frozen food packages are known in which the packaged food can be heated in a microwave oven prior to use. A common package of this type is the "TV dinner" package which is generally packaged in materials suitable for either a conventional oven or a microwave oven. In a typical package of this type, a metallic foil layer cover is retained for cooking in a conventional oven but is replaced with a plastic cover for cooking in a microwave oven.

Packages of this type are also known for various other types of food products including those containing portions which are intended to remain frozen, such as frozen desserts. These packages usually include a further component which is intended to be thawed or melted before use. Several such packages are described in the patent literature and a brief description of several examples follows.

U.S. Pat. No. 2,714,070 (Welch) discloses a method of heating a food package in a microwave heating apparatus. One embodiment of the invention, shown in FIG. 7, includes a one-compartment package in the form of an upside down cone containing ice cream and sauce in direct contact with each other. The package is gently heated in a microwave oven to only heat the interfaces between the sauce and the package. The package is then removed from the ice cream and sauce to leave a cold dessert wherein neither the ice cream nor the sauce have been heated substantially. The upper portion of this package may be provided with an exterior shielding of microwave reflective material to prevent excess heating of the sauce.

U.S. Pat. No. 4,233,325 (Slangan et al.) discloses a two-compartment package wherein the lower compartment includes frozen or refrigerated ice cream and the upper compartment includes frozen or refrigerated syrup which is supported on a sheet of microwave reflective material which forms a bottom closure of the upper compartment. The lower compartment of this container is substantially impermeable to microwave energy and the upper compartment is microwave permeable. The container is placed in a microwave oven and the syrup is melted. The container is then removed from the microwave oven and in one embodiment the upper compartment and the contents of the upper compartment is removed from contact with the lower compartment and the contents of the upper compartment are poured into the lower compartment. In another embodiment, the upper compartment is punctured to allow its contents to flow into the lower compartment and then the upper compartment is removed from the lower compartment.

U.S. Pat. No. 4,555,198 (Levendusky et al.) discloses a metal container system for use in microwave ovens. The container has a bottom metal tray and a heat-resistant, microwave transparent lid. The metal tray includes an organic coating thereon.

U.S. Pat. No. 2,600,566 (Moffett, Jr.) discloses a method for dielectrically heating a food package which may contain ice cream and a syrup and controlling the heating effect by an electrically conductive shield which acts to prevent heating waves from reaching some portions of the package. In the particular embodiment including ice cream and syrup, the ice cream is separated from the syrup by nn edible or other insulating barrier which divides the package into two distinct compartments.

U.S. Pat. No. 4,133,896 (Standing et al.) discloses a food package for storing and heating frozen or refiegerated foods in a microwave or conventional oven. The microwave penetrable container includes therein a farinaceous food product and a separate condiment package housed entirely within the microwave reflective material which at least partially encloses the condiments. Upon heating, the condiments will be heated at a slower rate than the farinaceous food product in order to prevent overheating of the condiments.

It is an object of the invention to provide a packaged frozen food product containing a first frozen food component which is intended to remain substantially frozen when eaten and a second component which is intended to be thawed and which is in contact with the first frozen component when eaten, the package serving as a container for storing the frozen food, for heating the frozen food in a microwave oven to thaw and/or heat the second component, and, when merely opened, as a container for the food as it is being eaten.

These and other objects of the present invention will be apparent to one of ordinary skill in the art from the summary and detailed description which follows.

DISCLOSURE OF THE INVENTION

The present invention relates to a packaged food product having a first package portion generally U-shaped in cross section and being transparent to microwave radiation. A first frozen food component is located inside the first package portion, the first food component being one which is intended to be thawed and/or heated before being eaten. The present invention also includes a second package portion generally U-shaped in cross section and being reflective of microwaves and a second frozen food component located in the seoond package portion, the second food component being one which would be liquid when thawed but which is intended to remain substantially frozen when eaten. The first and second package portions are joined together in a manner such that the legs of the U-shaped portions are disposed towards one another to form a one-compartment package. In the one-compartment package, the first frozen food component is located in the trough of the first U-shaped package portion and the second frozen food component is located in the trough of the second U-shaped package portion. The first and second frozen food components are spaced from one another in the package. The space between the first and second frozen food components is open. When the packaged food product is subject to microwave heating the first frozen food component is thawed and/or heated while the second frozen food component remains substantially frozen.

Preferably one of the two package portions additionally contains an annular shoulder near the top of its sidewall and protruding from this annular shoulder is an annular flange. The annular shoulder and annular flange function to provide a tight fit between the two packages when they are joined together to form a one-compartment package.

In one preferred embodiment of the invention (hereinafter referred to as the first embodiment), the first food component is a liquid when heated such as a syrup and the second food component is ice cream, frozen edible emulsion, frozen pudding or the like and the combination upon microwave heating produces a hot fudge sundae or similar product. In another preferred embodiment of the present invention (hereinafter referred as the second embodiment) the first food component is solid when thawed or heated, such as cake, brownie, pie or the like, and the second food component is ice cream, frozen edible emulsion, frozen pudding or the like and the combination upon microwave heating produces a pie ala mode, brownie ala mode or similar product.

BRIEF DESCRIPTION OF THE DRAWINGS

FIG. 2 is a cross-sectional side elevation view of the package of the present invention.

FIG. 3 is a side elevation view of an alternate embodiment of the food package of the present invention.

BEST MODE FOR CARRYING OUT THE INVENTION

Figure 1:
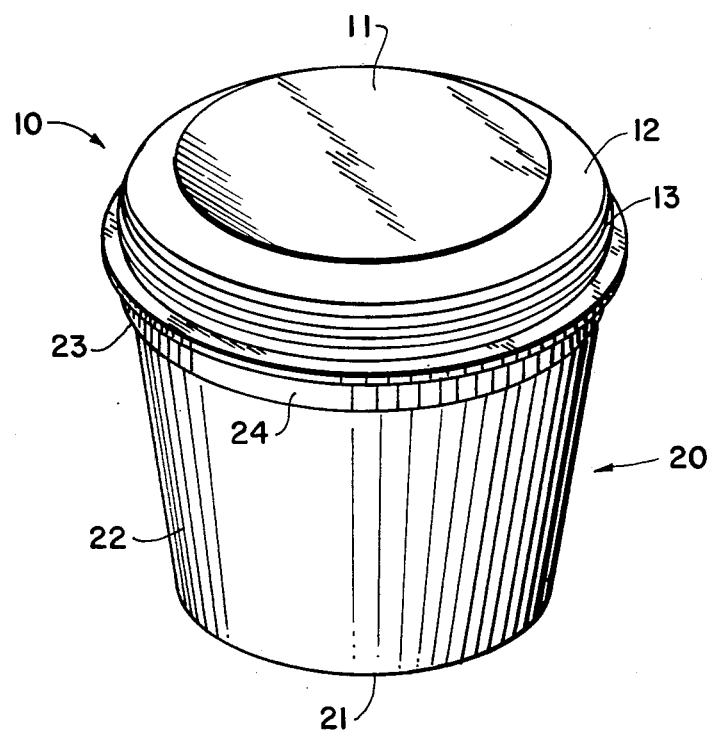
FIG. 1 is a side elevation view of the food package of the present invention.

The food package of the present invention includes a first package portion 10 and a second package portion 20. The first package portion 10 of the food package has a generally U-shaped cross-section and includes a top 11, sidewall 12 and an open bottom. The first package portion 10 of the preferred embodiment may also include a plurality of annular ridges 13 on its inner surface. Alternately, the first package portion may contain a retaining ring or device which would function to retain the frozen contents in the first package portion. The second package portion 20 also has a generally U-shaped cross section and includes a bottom 21, sidewall 22 and an open top. In addition, the second package portion 20 has an annular shoulder 23 near the top of sidewall 22. Protruding upwardly from the annular shoulder 23 is an upstanding annular flange 24. In plan view, the package may have any desired shape such as round, oval, square, rectangular, triangular or the like.

The first package portion 10 is constructed from a material which is substantially permeable to the passage of microwave energy. The first package portion 10 is preferably constructed from plastic. The second package portion 20 is constructed from a microwave reflective material such as a metal foil.

In the preferred embodiment of the present invention a conveniently consumable portion of a first frozen food component 14 is housed in the first package portion 10, and a conveniently consumable portion of a second frozen food component 25 is housed in the second package portion 20. Preferably, the two food portions together make up a single serving. The first frozen food component 14 is separated from the second frozen food component 25 by an open void space 30.

The existence of the void space 30 is an important aspect of the present invention. The void space 30 helps to insulate the first frozen food component 14 from the second frozen food component 25 during heating. In this manner all of the first component 14 is heated above its thawing temperature without conductive cooling from the second frozen food component 25. Such conductive cooling would occur if the second frozen food component 25 were in direct physical contact with the first food component 14 during the heating period. The void space 30 may be filled with air, or any other gas which is inert with respect to the package contents and not harmful to the consumer. Preferably, the void space should measure a distance of $\frac{1}{2}$ to $\frac{3}{4}$ inch from the first and second frozen food components. If the void space is narrower than $\frac{1}{2}$ inch, the second frozen food component 25 will cool down the first frozen food component 14. This is especially detrimental where the first frozen food component is being heated and liquified such as in a hot fudge sundae type product. If the void space substantially exceeds $\frac{3}{4}$ inch, the first frozen food component will overheat and possibly boil and/or adversely change the consistency of this component.

In the first embodiment of the present invention the food package when heated will produce an ice cream sundae type/hot fudge sundae product. The first frozen food component 14 is preferably one which is intended to be a heated liquid when thawed or heated, such as a frozen syrup of any flavor or variety, such as chocolate syrup or fruit syrups, preserves and the like. The second frozen food component 25 is preferably ice cream of any flavor or variety, frozen emulsion, frozen pudding and the like.

To prepare the frozen food product of this embodiment, a substantially totally microwave permeable first package portion 10 is inverted and a conveniently consumable portion of a syrup 14 is placed into the inverted first package portion 10 preferably the syrup is in a melted state and then frozen therein to cause adherence between the frozen syrup 14 and the first package portion 10.

The frozen syrup 14 must be capable of remaining in the first package portion 10 when it is in the frozen state in order for the syrup 14 to be held in the first package portion 10. Preferably, the frozen syrup 14 must be capable of adhering to the inner surface of the first package portion 10 when it is in the frozen state. There are several factors which contribute to the adherence of the frozen syrup 14 to the inner surface of the first package portion 10. Among these factors is the ability of the frozen syrup 14 to stick to the first package portion 10 by simple adhesion thereto. A second factor is expansion of a water-containing liquid as it freezes which will promote a tight fit between the frozen liquid and the package material.

Another factor is package configuration. For example, internal annular ridges 13 will aid the adherence of the frozen syrup 14 to the first package portion 10 by increasing the surface area of contact between the frozen syrup 14 and the first package portion 10 and by providing a limited amount of support to the frozen syrup 14 when the first package portion 10 is placed in position on the food package.

The microwave reflective second package portion 20 of the ice cream sundae type food package is then partially filled with a conveniently consumable portion of a second frozen food component 25 such as ice cream, frozen emulsion, frozen pudding and the like. It is important that enough space remain above the ice cream 25 in the second package portion 20 to contain the first and second frozen food components and still have space remaining to prevent spillage of the food, when consumed in the instance where the packaged frozen food product is a hot fudge sundae. Preferably some additional space is reserved such that the consumer can consume the food product without having the package contents overflow out of the first package portion 10.

The frozen food package of the present invention is assembled by fitting the two package portions together such that the wall of one of the U-shaped package rests upon the annular shoulder of the wall of the other package portion as shown in the drawings. In the embodiment shown in FIGS. 2 and 3 the frozen food package is assembled by fitting the first package portion 10 into the second package portion 20 such that the wall 12 of the U-shaped first package portion 10 rest upon the annular shoulder 23 of the wall 22 of the second package portion 20. These figures which represent the first embodiment of this invention represent food packages which are suitable for the preparation of a hot fudge sundae type product. The upstanding annular flange 24 will exert pressure on the legs 12 of the first package portion 10 to provide a tight fit between the first package portion 10 and the second package portion 20. The package is assembled by fitting the two package portions together, it may then be individually wrapped in a plastic film or included in a larger sealed package containing several of the frozen food packages of the present invention. The frozen food package of the present invention need not be opened once it is sealed in the factory until it is ready to be consumed.

In the second embodiment of the present invention the food package when heated in a microwave oven will produce a pie ala mode, brownie ala mode or cake ala mode. The first frozen food component 14 is solid when thawed or heated such as cake, brownie, pie or the like. In this embodiment, the cake, pie, brownie or the like will be placed in the first package portion 10. The second package portion which is microwave reflective is filled with a second frozen food component 25 such as ice cream, frozen emulsion, frozen pudding and the like. When heating this combined food package in the microwave oven the first package portion 10 is preferably placed below the second package portion 20 with the top 11 of the first package portion 10 resting on the floor of the microwave such that the second food component is above the cake, brownie or pie 14. Upon heating of this package the pie, brownie or cake will be heated and the second frozen food component, such as ice cream, will remain in a substantially refrigerated or frozen state. The product may be designed such that enough heat will penetrate to the ice cream to cause it to melt along the interface of the second package portion 20 and cause some or all of the ice cream fall into contact with the first frozen food component. In this embodiment it is important that the second frozen food component, the ice cream, adhere to the inner surface of the second package portion 20 such that, when the first package portion is lowermost, a void space 30 remains between the first frozen food component 14 and the second frozen food component 25 prior to heating the package in a microwave. After heating the consumer must transfer the second frozen food component out of the second package portion onto the thawed or heated first food component.

Referring now to FIG. 3, the first package portion 10 may additionally include an annular flange 15 around the perimeter of the sidewall 12. The U-shaped second package portion 20 may additionally include an upstanding annular flange 24 preferably made of a flexible material such as a metal foil. In this embodiment the first package portion 10 may be sealed to the second package portion 20 by folding the upstanding annular flange 24 over the annular flange 15 to form a seal between the first package portion 10 and the second package portion 20. It should also be noted that the height of the upstanding annular flange 24 may be varied in order to vary the amount of microwave shielding that is desired. A higher upstanding annular flange 24 will provide increased microwave shielding of the package contents, whereas a lower upstanding annular flange 24 will provide decreased shielding of the package contents.

In use, the consumer takes an unwrapped frozen package and places it in a microwave oven for a short period of time, generally from 30 seconds to 60 seconds for a single serve package, which is sufficient to thaw the first frozen food component 14. In the case of the ice cream and syrup embodiment (the first embodiment), the packaged frozen food product is placed in the microwave with the second package portion bottom 21 resting on the floor of the microwave. The thawing and heating of the first frozen component 14 will cause the syrup to flow by gravity into contact with the substantially frozen ice cream to thereby provide an instant, ready-to-eat hot fudge sundae. Preferably the syrup is chocolate syrup which when microwave heated reaches a temperature within the range of from about 185° F. to about 225° F. Once this occurs, the consumer removes the package from the microwave oven, and removes the first package portion 10 from the second package portion 20 to expose the package contents for consumption. At this point the majority of the first food component 14 and all of the second substantially frozen food component 25 will both be contained in the second package portion 20. The consumer may wish to transfer any residual amount of the heated first food component onto the second food component contained within the second package. As can be seen in the first embodiment, this packaged food product of the present invention is intentionally designed to permit the first food component located within the first package portion to fall by gravity onto the second food component within the second package portion. No pouring or other activity is required by the consumer to transfer the food component from the upper package portion into direct contact with the food component in the lower package portion. The first food component 14 in essence, may pour itself onto the second food component 25 as it is thawed/heated.

It will be apparent to one of ordinary skill in the art from the foregoing description that many modifications may be made without departing from the spirit of the invention. Therefore, the scope of the present invention is not to be limited to the particular details illustrated herein and shall be defined by the claims appended hereto.

We claim:

1. A process for making an ice cream sundae type product comprising:

(a) providing a first package portion having an open end and a generally U-shaped cross section, said first package portion being transparent to microwaves;
(b) filling said first package portion, with a melted syrup and freezing to enable adherence thereto;
(c) providing a second package portion having an open end and a generally U-shaped cross section, said second package portion being reflective to microwaves;
(d) partially filling said second package portion with either an ice cream, frozen edible emulsion or frozen pudding;
(e) removably securing the open ends of said U-shaped portions together to form a one-compartment package wherein the first and second frozen food components are spaced apart from each other, said space being open, the open space measuring from about one-half inch to about three-quarter inch; and
(f) subjecting the one compartment package to microwave heating in a microwave oven for a period of time sufficient to cause the majority of the frozen syrup to liquify and reach a temperature within the range of from about 185° F. to about 225° F. while the ice cream, frozen edible emulsion or frozen pudding remains substantially frozen.

2. The process according to claim 1 wherein when the one compartment package is heated in the microwave oven with the first packaged portion being uppermost and the second packaged portion resting on the floor of the microwave oven the frozen syrup will liquify and fall down by gravity on the ice cream, frozen edible emulsion or frozen pudding. pg,18

3. The process according to claim 1 wherein said syrup is selected from the group consisting of chocolate syrup, fruit syrup and fruit preserve.

4. The process according to claim 1 wherein the one compartment package in step (f) is a single serve package which is subjected to microwave heating for from 30 to 60 seconds.

* * * * *